(12) United States Patent
Dawson

(10) Patent No.: US 7,382,969 B2
(45) Date of Patent: Jun. 3, 2008

(54) METHOD AND SYSTEM FOR PREVENTING THE UNAUTHORIZED COPYING OF VIDEO CONTENT

(75) Inventor: Thomas P. Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 965 days.

(21) Appl. No.: 10/370,886

(22) Filed: Feb. 19, 2003

(65) Prior Publication Data

US 2004/0161225 A1    Aug. 19, 2004

(51) Int. Cl.
*H04N 5/91*     (2006.01)
*H04N 7/167*    (2006.01)
*G03B 21/32*    (2006.01)
*G11B 19/04*    (2006.01)
*H04L 9/00*     (2006.01)

(52) U.S. Cl. .............. 386/94; 352/40; 360/60; 380/201; 713/176

(58) Field of Classification Search ............. 386/94; 352/40; 360/60; 380/201; 713/176; 345/629; 348/247; 725/37
See application file for complete search history.

(56) References Cited

U.S. PATENT DOCUMENTS

| | | | |
|---|---|---|---|
| 5,949,877 A | 9/1999 | Traw et al. | 380/4 |
| 5,959,717 A * | 9/1999 | Chaum | 352/40 |
| 6,314,518 B1 | 11/2001 | Linnartz | 713/176 |
| 6,507,907 B1 | 1/2003 | Takahashi | 713/150 |
| 6,542,618 B1 * | 4/2003 | Rhoads | 382/100 |
| 7,092,616 B2 * | 8/2006 | Unger | 386/94 |
| 2002/0083324 A1 * | 6/2002 | Hirai | 713/176 |

* cited by examiner

*Primary Examiner*—Thai Tran
*Assistant Examiner*—Syed Y. Hasan

(57) ABSTRACT

A method for preventing the copying of useable video content is disclosed. The method includes identifying the video signal content of a video signal that is suitable to be extracted, extracting video content from the video signal to transmit to a receiver, and replacing the extracted video content with marred video content in the video signal. The method further includes placing the extracted video content in a user data channel of a program stream for transmission to a receiver. In addition, the method includes transmitting portions of the video signal that contains the marred video content in a first channel of the program stream, and transmitting the extracted video content in a second channel of the program stream to the receiver. The signals transmitted in the program stream are synchronized for presentation in the display of the receiver. Only the program stream components that contain the marred video content may be recorded by a VCR or DVD recorder and the marred video is unsuitable for piracy or rebroadcast.

35 Claims, 8 Drawing Sheets

100

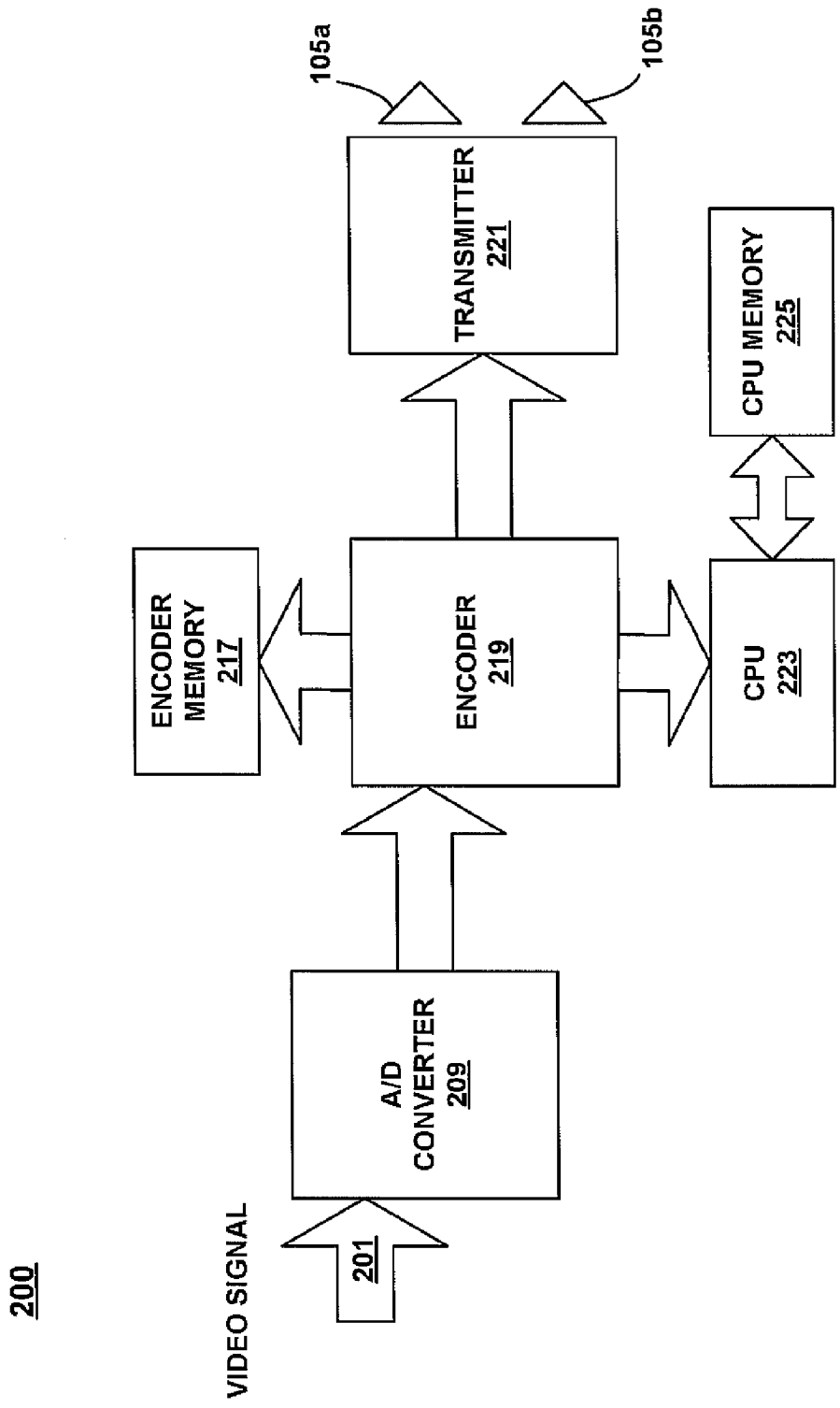

300

400

500

| OVERLAY_ID 501 | PRESENTATION TIME STAMP 503 |
|---|---|
| X,Y POSITION 505 | DELTA X PER FRAME 507 |
| DELTA Y PER FRAME 509 | NUMBER OF FRAMES 511 |
| GRAPHICS OVERLAY DATA (INDIVIDUAL FRAMES OR COMPRESSED DATA) 513 ||

FIGURE 5

METHOD AND SYSTEM FOR PREVENTING THE UNAUTHORIZED COPYING OF VIDEO CONTENT

FIELD OF THE INVENTION

The present invention relates generally to the transmission of video content. In particular, an embodiment of the present invention relates to preventing the unauthorized copying of transmitted video content.

BACKGROUND OF THE INVENTION

Feature presentations such as sporting events, live concerts, and broadcast premieres etc., are among the most highly valued assets of television program content providers. Their exclusive control of the availability of this material significantly increases its value. Consequently, program content providers are able to charge a premium for access to such programs. The unauthorized copying of these programs diminishes their value.

Currently, content providers are limited in their capacity to prevent unauthorized copying of program content. One measure employed by content providers is watermarking. Watermarking entails placing a logo on the displayed video image. In many cases the logo is placed in the corner of the displayed video image. However, this measure has proven to be practically useless as a meaningful deterrent to unauthorized copying of the program.

Another technique that has been employed is the use of copy control information (CCI). A feature of this scheme is the transfer of data from transmitter to receiver where the transmitter side system determines the copy restriction level of the content that is being transmitted. In addition, the qualifications of the receiver side system to receive the content can be verified. If complete authentication is established between the receiver-side system and the transmitter-side system, the content is encrypted and transmitted from transmitter to receiver. Once the content has been received, the CCI information may be modified to indicate that copying is prohibited so that unauthorized copying may be prevented.

A drawback of the use of CCI information is its reliance on the receiver side system to perform operations that prevent receiver-side devices from making unauthorized copies of the transmitted content. For example, upon receiving the transmitted content, the receiver side system may be employed to rewrite the CCI information to include data that either facilitates: (1) free copying, (2) the permission of one time copying, or (3) the prohibition of copying altogether. However, because of the relative ease with which the data that facilitates the free copying of the transmitted content may be manipulated, through such manipulation, unauthorized copying may be facilitated.

Other measures employed include the inclusion of stern warnings that outline the legal penalties that may be incurred for making copies of video content or re-broadcasting it without permission. However, such measures do not eliminate the users capacity to make perfectly clean copies of transmitted video content using VCR or DVD recorders. Consequently this system, along with the other systems currently available, do not prevent the unauthorized copying of transmitted video content, that is currently widespread, from continuing unabated.

SUMMARY OF THE INVENTION

Accordingly, a need exists for a method and system that allows the viewing of broadcaster (e.g., content provider) provided video content but prevents the unauthorized copying of the video content. The present invention provides a method and system that accomplishes this need.

A method and system for preventing the unauthorized copying of video content are disclosed. The method includes identifying the video signal content of a video signal that is suitable to be extracted, extracting video content from the video signal to transmit to a receiver, and replacing the extracted video content with marred video content. The method further includes placing the extracted video content in a user data channel of a program stream for transmission to a receiver. In addition, the method includes transmitting portions of the video signal that contain the marred video content in a first channel of the program stream, and transmitting the extracted video content in a second channel (e.g., user data channel) of the program stream to the receiver. The signals transmitted in the program stream are synchronized for presentation in the display of the receiver. Only the program stream components that contain the marred video content may be recorded by a videocassette recorder (VCR) or digital video disc (DVD) recorder. In one embodiment, a graphics overlay can be used to merge the two channels in order to eliminate the marred images for viewing the broadcast images.

The transmission embodiments of the present invention provide a method for preventing the copying of useable quality video content from a series of video frames. The method includes extracting video content from a video signal to transmit to a receiver. The video content is extracted from portions of the video signal that correspond to video blocks located in a series of video frames and is replaced with marred video content. The method further includes transmitting the video signal components that contain the unmarred video content in a first channel and transmitting extracted video content in a second channel of a program stream to the receiver for synchronized presentation in a display of said receiver.

The receiver embodiments include receiving the channel having the marred images and the channel having the extracted images. The extracted images are synchronized with the marred images to replace them. The extracted images are displayed within the graphics overlay plane of the display. Since the graphics overlay plane is not recorded, only marred images can be recorded by a DVD or VCR. The marring of the video is such that the video is unsuitable for piracy, resale, or rebroadcast The embodiments of the present invention provide a video transmission system having either analog or digital video input, a digital video output, and an encoder for digitally encoding a video signal. The digital encoder is configured to perform a method for preventing the copying of video content. The method includes identifying the video signal content of a video signal that is suitable to be extracted, extracting video content from the video signal to transmit to a receiver, and replacing the extracted video content with marred video content. The method further includes placing the extracted video content in a user data channel of a program stream for transmission to a receiver. In addition, the method includes transmitting portions of the video signal that contains the marred video content in a first channel of the program stream, and transmitting the extracted video content in a second channel (e.g., user data channel) of the program stream to the receiver. However, the signals transmitted in the program stream are synchronized for presentation in the display of the receiver. Only the program stream components that contain the marred video content may be recorded by a VCR or DVD recorder.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 2 is a block diagram of video content encoder/transmission system according to one embodiment of the present invention.

FIG. 5 is a data structure diagram that shows the type of pixel data that is transmitted in packets of a program stream according to one embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in logic blocks other symbolic representations of operations on data bits within a computer system or electronic computing device. These descriptions and representations are the means used by those skilled in the data processing arts to most effectively convey the substance of their work to others skilled in the art. A logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "identifying" or "extracting" or the like, refer to the action and processes of an electronic computing device, that manipulates and transforms data.

Exemplary System in Accordance with Embodiments of the Invention

Figure 1:
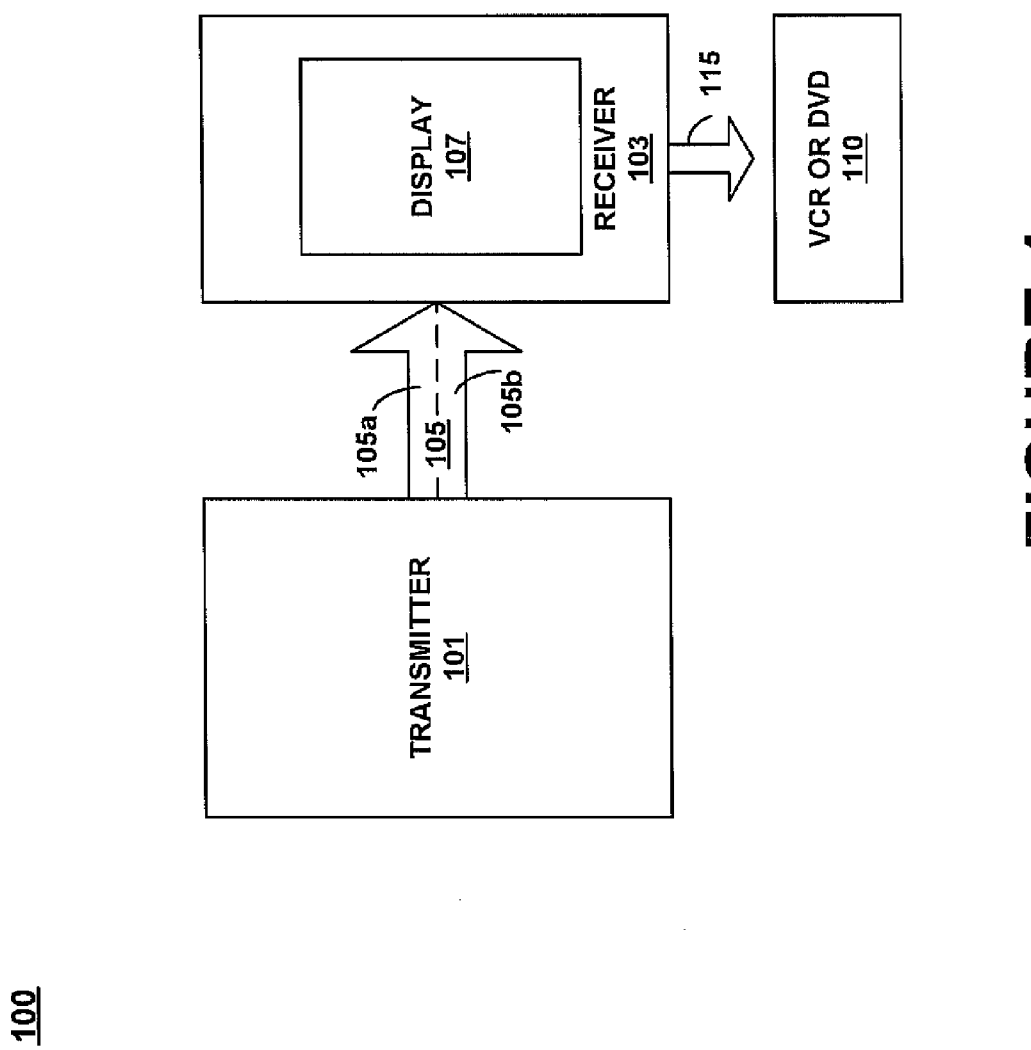
FIG. 1 shows a transmitter/receiver network that facilitates the communicating of video content according to one embodiment of the present invention.

FIG. 1 shows a transmitter/receiver network 100 that facilitates the communicating of video content from transmitter to receiver according to one embodiment of the present invention. According to exemplary embodiments, a program stream 105 that is transmitted by transmitter 101 is configured to facilitate the presentation of seamless video images on the display of a receiver 103 while allowing only marred versions of that content to be recorded using a VCR or DVD recorder. Embodiments of the present invention include a program stream 105 that is comprised of channels that carry video signals from which video images displayed in graphics overlay and video image planes (see FIGS. 3A, 301 and 303) of the images presented in display 107 are derived. FIG. 1 shows transmitter 101, receiver 103, display 107 and program stream 105.

Transmitter 101 transmits a program stream 105 that includes multiple channels 105a and 105b that carry video signals from which video images displayed in both the graphics overlay memory plane and the video image memory plane (e.g., 301 and 303 FIG. 3) are derived and displayed (e.g., in 107). According to one embodiment of the present invention the graphics overlay (e.g., 301) and the video image (e.g., 303) memory planes may each contribute image portions to composite images that may be seamlessly presented in the receivers display 107 to viewers.

The components 105a of program stream 105 from which video images are derived that may be presented in the video image memory plane (e.g., 303 FIG. 3) may be extracted from a video signal (e.g., 201 FIG. 2) and replaced with marred content. The extracted (e.g., censored) video signal portions may then be transmitted in a channel 105b (e.g., user data channel) of the program stream 105 that carries video signals from which video images presented in the graphics overlay memory plane are derived. It should be appreciated that video images displayed in the graphics overlay memory plane may be synchronized with video images that may be displayed in the video image memory plane. As a result, composite images that include image portions that may be attributable to both the graphics overlay and the video image memory plane may be seamlessly presented on the display 107 of receiver 103 for viewing. This is the case because graphics overlay data takes display priority over the marred images. However, only the video signal portions of video signal containing the marred content may be recorded by a DVD or VCR 110. This is the case because only video signal portions corresponding to images shown in the video image plane are supplied to the DVD or VCR 110 over channel 115.

Receiver 103 receives the program stream 105 transmitted by the transmitter 101. The signal received contains program stream 105 components 105a and 105b from which images displayed in the video image plane and graphics overlay plane are derived. The images displayed in these planes are synchronized and may be viewed in a seamless and unmarred form on the display 107 of the receiver 103 during broadcast. It should be appreciated that the receiver 103 may receive the program stream signal via a set top box (STB) or built in receiving components. Only the program stream components that contain marred content may be recorded by a DVD recorder or VCR 110.

Program stream 105 includes components that may be displayed in either the graphics overlay plane 105b or the video image plane 105a. These components respectively include: (1) extracted video signal content 105b, and (2) video signal portions 105a that contain marred video content. These components may be carried in separate channels of program stream 105 in their transmission from the transmitter to receiver. It should be appreciated that the components of program stream 105 that may be displayed in the graphics overlay plane (e.g., extracted video signal content) are transmitted in the user data channel of program stream 105 in accordance with one embodiment. Other components of program stream 105 may be transmitted in a separate channel. The video components of program stream 105 may be synchronized so that they may be displayed in a seamless and unmarred form by the receiver. However, because only the program stream 105 components which include video signal portions that contain marred video content may be recorded by a VCR or DVD recorder, the images derived from such a recording will be seriously marred.

FIG. 2 is a block diagram of video transmission system according to one embodiment of the present invention. The system 200 depicted in FIG. 2 facilitates the transmission of video content over cable or broadcast media. FIG. 2 shows video signal 201, analog to digital converter 209, encoder 219, encoder memory 217, radio frequency (RF) transmitter 221, CPU 223 and CPU memory 225.

Video signal 201 is transmitted to analog to digital converter 209 and digitized. The digitized signal is then transmitted to and processed by encoder 219, e.g., an MPEG encoder. The encoder 219 identifies video content in the video signal suitable to be extracted. According to one embodiment, the encoder 219 monitors the video signal 201 for components of the video signal that have associated motion vectors as a part of this identification process (see FIG. 7 discussion). The video signal content that is identified is extracted and replaced with marred video content. The extracted video signal content and the video signal (e.g., 201) portions that contain marred video content are config-ured by the encoder 219 to be transmitted in separate channels of a highly-compressed program stream (e.g., 105). Encoder 219 communicates the signal to transmitter 221 for transmission to a receiver (e.g., 103). The transmission medium can be radio, cable satellite etc. It is appreciated that almost any video pattern or image can be used as the marred image as long as it makes viewing the content undesirable to the viewer. In one example, it could be blanked out with a solid color or a fixed pattern, or random noise could be used, or some other type of image artifact could be used.

Encoder memory 217 may contain application programs or components thereof from which all or parts of the functionality exhibited by encoder 219 that is described herein may be derived. Additionally, it should be appreciated, all or parts of this functionality may be provided by hardware. Transmitter 221 sends the marred channel 105a and extracted data 105b.

Central processor unit (CPU) 223 controls aspects of the functionality of the encoder/transmitter system 200. CPU 223 may be a microprocessor or any other type of processor. CPU memory 225 stores information and instructions for central processor unit (CPU) 223.

Figure 3A:
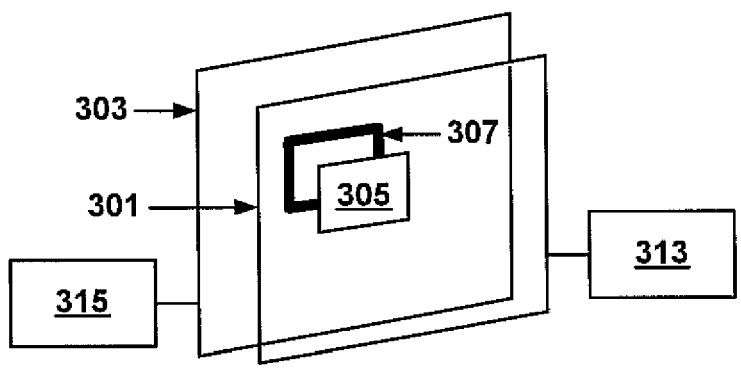
FIG. 3A shows a diagram that illustrates the interrelated functionality of a video image plane and a graphics overlay plane according to one embodiment of the present invention.

FIG. 3A show schematics 300 that illustrate the interrelated functionality of the video image plane 303 and the graphics overlay plane 301 according to one embodiment of the present invention. These planes are well known in the art. The image planes together may produce a seamless composite image on the display of a receiver (e.g., 103) that may be presented to a viewer. However, only marred images may be generated from an attempt to record the underlying program stream (e.g., 105) signal by a VCR or a DVD recorder. This is because VCRs and DVD recorders may only record program stream components from images displayed in the video image plane 303 which include, as previously mentioned, marred video content. FIG. 3A shows video image plane 303, video image plane memory 315, graphics overlay plane 301, graphics overlay plane memory 313, extracted video signal content 305 and marred video content 307.

Video image memory plane 303 displays images derived from components 105a of program stream 105. The video image memory plane 303 displays images that may include censored portions (e.g., marred video content 307). However, the contents of the censored portions 105b (e.g., extracted video signal content 305) may be displayed in the graphics overlay memory plane 301 and synchronized with the images shown in the video image memory plane 303. Consequently, the image planes may function together to produce a seamless composite image on the display of the receiver that may be presented to viewers. Video image memory plane 303 includes an associated memory unit 315 that may store components of the program stream 105 from which video images displayed in the video image plane are derived.

Graphics overlay memory plane 301 displays images derived from components 105b of program stream 105. The graphics overlay memory plane 301 displays images that include the contents of the censored portions (e.g., extracted video signal content 305) of program stream 105. As mentioned above, the graphics overlay and video image planes may function together to produce a seamless composite image on the display of the receiver that may be presented to viewers. Graphics overlay plane 301 includes an associated memory unit 313 that stores components of the program stream that 105 from which images displayed in the graphics overlay memory plane 301 are derived. According to one embodiment these video components may be stored for reuse in a plurality of frames.

Figure 3B:
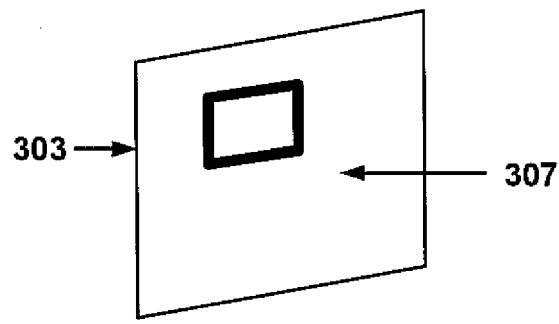
FIG. 3B is a diagram that illustrates the state of the video content that may be reproduced from the recording of a program stream by a VCR or DVD according to one embodiment of the present invention.

FIG. 3B is a schematic 300B that illustrates the state of the video content that may be reproduced from the recording of program stream 105 by a VCR or DVD according to one embodiment of the present invention (and that which is provided over 115 in FIG. 1). Shown in FIG. 3B is video image plane 303 which displays images derived from the components of a program stream (e.g., 105) that include censored portions (e.g., portions blocked by marred video content 307). According to one embodiment of the present invention, only components of the program stream that contain marred video content 307 may be recorded by a VCR or DVD recorder (e.g., via output 115). Accordingly, the schematic of FIG. 3B represents the content that may be reproduced from a VCR or DVD recording. It is appreciated that one or more marred regions may be placed in a frame.

As discussed previously, the censored portions (e.g., marred video content 307) of the video images correspond to video blocks that have motion vectors associated with them in one embodiment. These censored video blocks are comprised of moving portions of the transmitted video content and therefore represent some of the most valued portions of the images that may be presented in a display (e.g., portions of most interest to viewers). Consequently, any attempt to display video content derived from a recording of the underlying program stream (e.g., 105) will result in the displaying of seriously marred video images (as shown and discussed with reference to FIG. 3B). In this manner, the unauthorized copying of transmitted content may be discouraged. It should be noted that personal video recorders (PVRs), which may record the entire program stream (e.g., 105) and user data signal to a hard disk may replay unmarred video images as was transmitted from the content provider. However, any attempt to record to a VCR or DVD recorder from the PVR will result in the recording of marred video images as these devices may only record components 105a of the recorded program stream (e.g., 105) from which images that include the marred video content (e.g., 307) are derived.

Figure 4A:
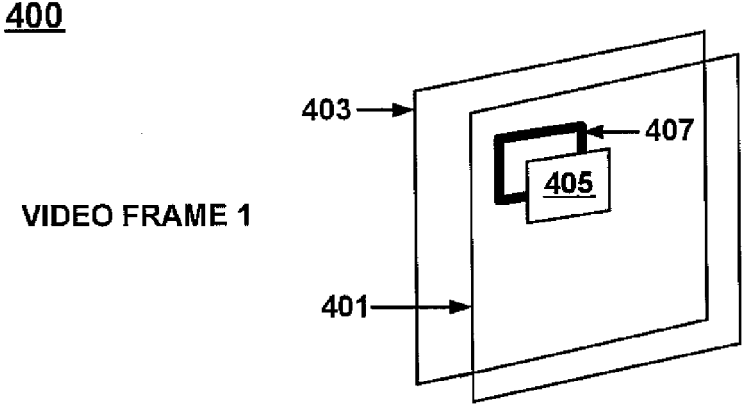
FIG. 4A, FIG. 4B, and FIG. 4C show diagrams that illustrate a process of video block extraction executed according to one embodiment of the present invention.
Figure 4B:
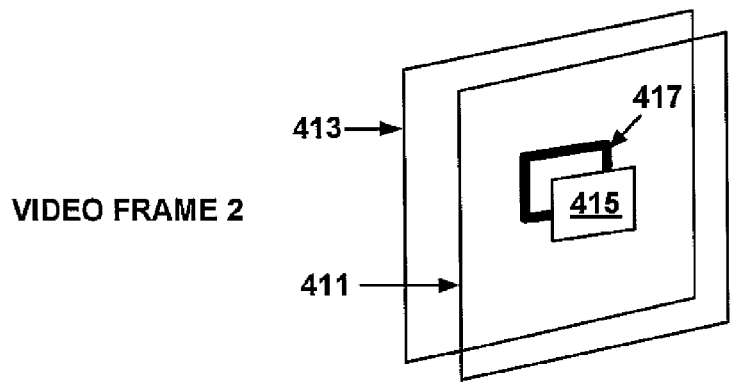
Figure 4C:
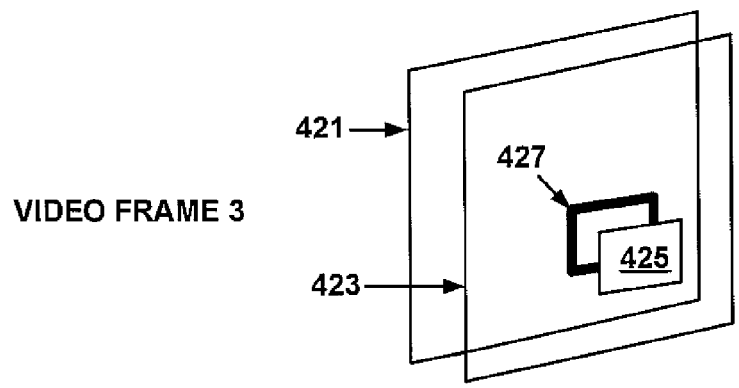

FIGS. 4A-4C show a diagram series 400 that illustrates a process of video block extraction executed according to one embodiment of the present invention. FIG. 4A shows video frame 1 including video image plane 403, graphics overlay plane 401, marred video content 407 and extracted video signal content 405. FIG. 4B shows video frame 2 including video image plane 413, graphics overlay plane 411, marred video content 417 and extracted video signal content 415. And, FIG. 4C shows video frame 3 including video image plane 423, graphics overlay plane 421, marred video content 427 and extracted video signal content 425.

According to one embodiment of the present invention, motion vectors that are associated with the aforementioned extracted video signal content (e.g., MPEG-2 macro blocks) help to identify static blocks of video content (e.g., 405, 415 and 425) that may be translated in their entirety to a series of positions within successive frames (see video frames 1-3 of FIGS. 4A-4C). According to one embodiment, these static blocks of video content may correspond to a censored portion of displayed images that may be displayed at different positions (see various positions of the extracted video signal content in FIGS. 4A-4C) in each of the successive frames (see video frames 1-3 shown in FIG. 4A-4C).

According to one embodiment, extracted video signal content (e.g., 405, 415, and 425) may be used several different times. The extracted video content may be retained for reuse (e.g., such as in a memory associated with the graphics overlay plane) since the video images presented in the different video frames (e.g., see FIGS. 4A-4C) may employ the same blocks of corresponding static pixel data at successive positions. It should be appreciated that the absence of a necessity to re-transmit this data (e.g., extracted video signal content) frees user data channel bandwidth space that the data would otherwise occupy and allows additional vector related macro blocks to be transmitted.

It should be appreciated that according to one embodiment, the censored portions of the video (e.g., 407, 417, and 427) may consist of macro blocks. According to one embodiment these macro blocks may include MPEG macro blocks. These blocks may consist of video content that is associated with motion vectors (not shown). As previously discussed, the video content may be replaced with marred video content (e.g., 417). According to one embodiment this marred video content (e.g., 417) may consist of all black, patterned or other solid color content. The content of the censored portions (e.g., extracted video signal content 415) may be transmitted in a separate channel (e.g., a user data channel) for display in a synchronized format in the overlay plane. A seamless composite image that includes video images attributable to both the video image and the graphic overlay planes (e.g., 403 and 401 respectively) may be presented on the receivers display to a viewer. The extracted data of the graphics overlay plane is synchronized with the video display plane data. A co-pending patent application entitled "Method and Apparatus for Synchronizing Dynamic Graphics," by Dawson, Thomas Patrick and filed on May 28, 2002 describes a means of displaying image data in the graphics overlay plane that is synchronized to the displayed video. This patent application is hereby incorporated by reference.

In an alternate embodiment, the macro blocks of censored content (e.g., extracted video signal content 405) may be extracted at random. According to such an embodiment, because the content of the block may constantly change, new data must constantly be sent through the user data channel. Stresses on bandwidth capacity caused thereby may be mitigated by such measures as skipping frames between and, controlling the position of and the interval between, extractions of otherwise randomly extracted blocks of video content.

According to one embodiment, the techniques described herein may be applied to adult entertainment. According to this embodiment, a program stream (e.g., 105) may transmit blocks that obscure areas of displayed images chosen for censoring. It should be appreciated that content providers may enable the display of the censored content (in the graphical display plane) such as for the payment of a fee.

FIG. 5 is a data structure diagram 500 that shows the type of pixel data that is transmitted in packets of the user data portion of a program stream (e.g., 105B) according to one embodiment of the present invention. FIG. 5 shows overlay ID 501, presentation time stamp 503, x-y position 505, delta x per frame 507, delta y per frame 509, number of frames 511, and graphics overlay data 513. Metadata contained in the transmitted packets identifies whether the graphics overlay plane is used to display contained video content (e.g., overlay ID 501), the timing of its presentation (e.g., 503), the coordinates of its display position (e.g., 505), the change in those coordinates relative to previous frames (e.g., 507 and 509) and the number of frames in which it is presented (e.g., 511). According to one embodiment, graphics overlay data 513 may include the actual video content that is being transmitted. As suggested by the data itself, the information contained in the packet allows the packet to be properly processed and the contents thereof appropriately presented in a display (e.g., 107).

Exemplary Operations in Accordance with Embodiments of the Present Invention

Figure 6A:
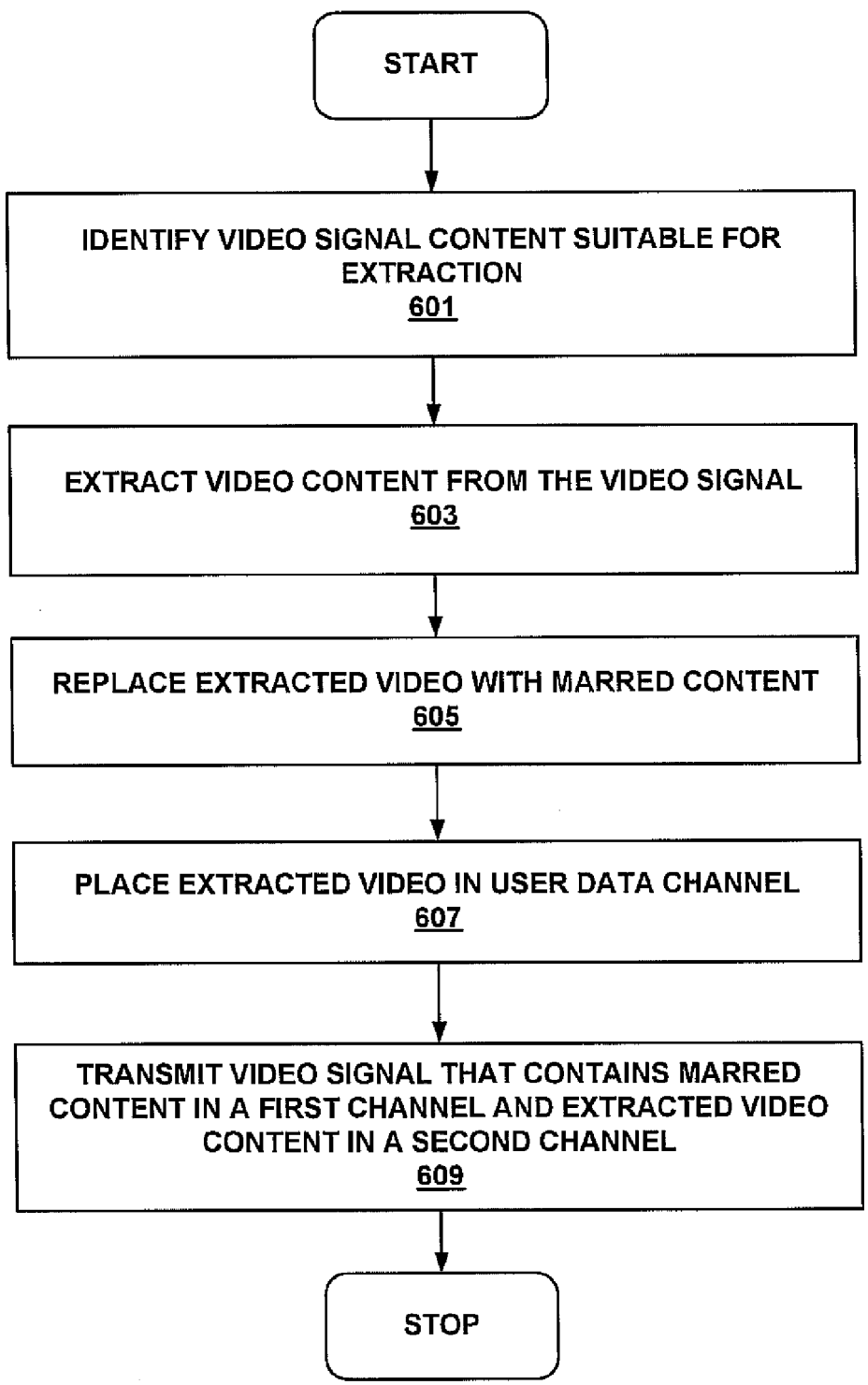
FIG. 6A is a flowchart of steps performed in a transmission process for preventing the copying of video content according to one embodiment of the present invention.
Figure 6B:
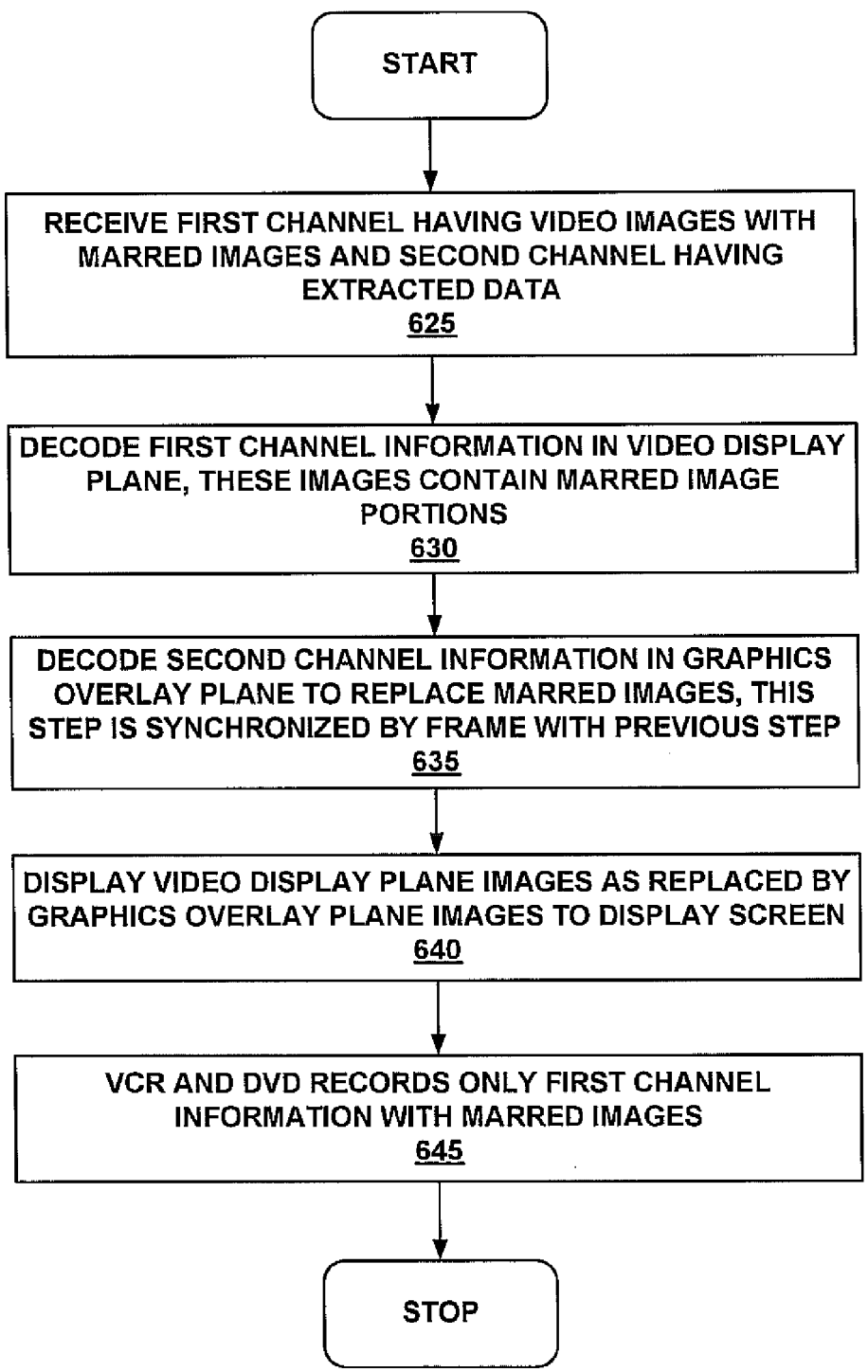
FIG. 6B is a flowchart of steps performed in a receive process for preventing the copying of video content according to one embodiment of the present invention.
Figure 7:
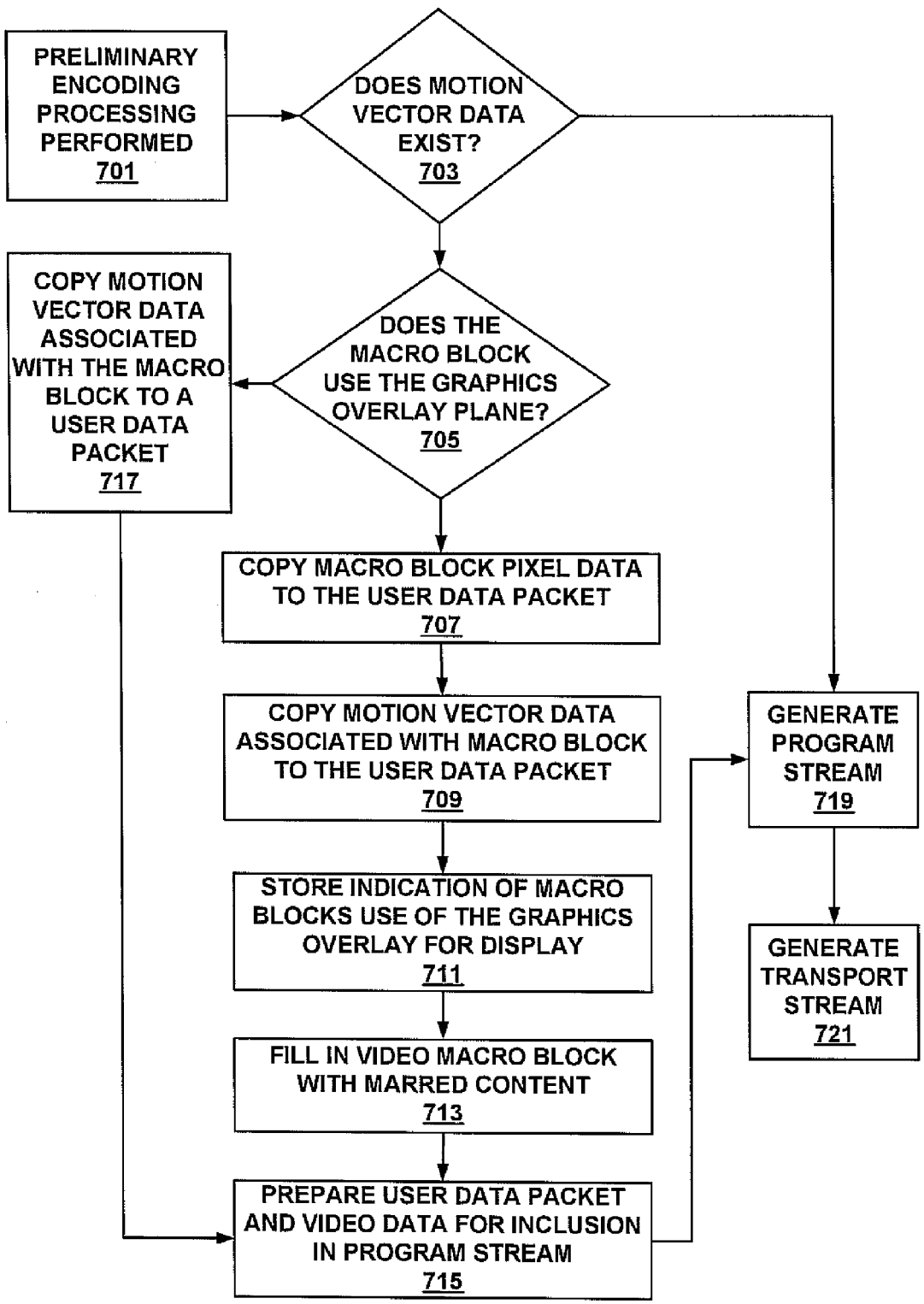
FIG. 7 is a flowchart of the steps performed in a process of identifying and extracting video signal content and generating a program stream that includes a user data channel that carries censored content according to one embodiment of the present invention.

FIGS. 6A, 6B and 7 show flowcharts, 600, 620 and 700, of the steps executed in processes of the present invention which, in one embodiment, are carried out by transmitters and receivers of the present invention. These devices may contain processors and electrical components under the control of computer readable and computer executable instructions. The computer readable and computer executable instructions may reside, for example, in data storage components such as memory units 217 and 225. However, the computer readable and computer executable instructions may reside in other types of computer readable medium as well. Although specific steps are disclosed in the flowcharts, such steps are exemplary. That is, the present invention is well suited to performing various other steps or variations of the steps recited in the flowcharts. Within the present embodiment, it should be appreciated that the steps of the flowcharts may be performed by software, by hardware or by a combination of both.

As discussed with reference to FIGS. 1-5, embodiments of the present invention facilitate the prevention of video content copying. FIG. 6A is a flowchart 600 of the steps performed in a process for transmitting data useful in preventing the copying of video content according to one embodiment of the present invention.

At step 601, portions of a video signal (e.g., 201) suitable for censoring are identified and are extracted at step 603. The extracted video signal content (e.g., 405) corresponds to blocks of pixels. According to one embodiment these blocks of pixels may be macro blocks of content (such as MPEG macro blocks) that are associated with well known motion vectors.

At step 605, the extracted video signal content (e.g., 405) is replaced with marred video content. This marred video content (e.g., 407) may include any image that is undesirable to view, e.g., solid black, patterned or other solid color blocks of video content. The resultant video images presented on the display of a receiver may be marred by these blocks that obscure portions of the displayed video image.

At step 607, the extracted video signal content (e.g., censored content) is placed in a user data channel 105*b* and synchronized with the video signal components 105*a* that contain marred video content (e.g., 407). The censored content is transferred through the user data channel to be shown in the graphics overlay plane (e.g., 403) of the displayed images.

At step 609, the video signal components that contain marred video content (e.g., 407), and the extracted video content (e.g., censored content 405) are transmitted in separate channels to a receiver for synchronized presentation to viewers. The synchronized video portions together present a seamless composite image as generated according to FIG. 6B below. As a result, the portions of the video image that may be attributable to the video image plane and to the graphics overlay plane may not be distinguishable by viewers.

FIG. 6B is a flowchart 620 of the steps performed in a process for receiving and recording video images according to one embodiment of the present invention.

At step 625, a signal is received that includes a first channel (e.g., 105*a*) that carries video images, and a second channel (e.g., 105*b*) that carries extracted video data. At step 630, the information carried in the first channel is decoded. As previously discussed, the images derived from this information may contain marred image portions. And, at step 635 the information carried in the second channel (e.g., corresponding to the graphics overlay plane) is decoded and synchronized by frame with the information decoded in step 630. A co-pending patent application entitled "Method and Apparatus for Synchronizing Dynamic Graphics," by Dawson, Thomas Patrick and filed on May 28, 2002 describes a means of displaying image data in a graphics overlay plane that is synchronized to displayed video. This patent application is hereby incorporated by reference.

At step 640, the synchronized images of the graphics overlay plane which replace the marred image portions of the video display plane are presented (e.g., displayed) as a part of a seamless video frame image. However, as is shown at step 645, a VCR or DVD may only record the first channel information that contains the marred image portions.

It should be appreciated that the process of preventing the copying of video content includes identifying and extracting video blocks and replacing them with marred video content as discussed with reference to FIG. 1-5. FIG. 7 is a flowchart 700 of the steps performed in a process of identifying and extracting video signal content and generating a program stream that includes a user data channel that carries censored content according to one embodiment of the present invention.

At step 701, preliminary encoding processing of the video signal is performed. At step 703, the system determines whether motion vector data exists for a macro block of video signal data (e.g., the system is interested in moving portions of the video which are generally of most interest to viewers and are therefore most suitable for identification and extraction). If motion vector data does exist, then at step 705, the system determines whether the macro block already uses the graphics overlay memory plane for presentation. If motion vector data does not exist, the video signal processed in step 701 is added to the video program stream generated at step 719. If the system determines that the macro block data already uses the graphics overlay memory plane for presentation at step 705, motion vector data associated with the macro block is copied to a user data packet at step 717.

If the system determines that the macro block data does not use the graphics overlay for its presentation the macro block pixel data is copied to a user data packet (e.g., user data channel) at step 707. According to one embodiment, this operation may include a conversion of the packet data to RGB pixel data. In another embodiment it is converted to UYV format pixel data. It should be appreciated that the operation performed at step 705 allows the system to avoid re-transmitting macro blocks that have already been transmitted to the receiver (e.g., 103) that may be reused.

At step 709, the motion vector data associated with the macro block is copied to the user data packet. At step 711, an identification of the macro block as a macro block that uses the graphics overlay plane is made and recorded. The information recorded provides the data that may be necessary to perform the operations executed at step 705. At step 713, the video data for the macro block is filled with marred content (e.g., black, some other solid color or a pattern). At step 715, the user data packet and the video data are prepared for inclusion with the program stream that is generated at step 719. And, at step 721, a transport stream is generated (e.g., the program stream is processed for transmission and is transmitted).

As noted above with reference to exemplary embodiments thereof, the present invention provides a method and system for preventing the copying of useable quality video content. The method includes identifying the video signal content of a video signal that is suitable to be extracted, extracting video content from the video signal to transmit to a receiver, and replacing the extracted video content with marred video content in the video signal. The method further includes placing the extracted video content in a user data channel of a program stream for transmission to a receiver. In addition, the method entails transmitting portions of the video signal that contains the marred video content in a first channel of the program stream, and transmitting the extracted video content in a second channel of the program stream to the receiver. The signals transmitted in the program stream are synchronized for presentation in the display of the receiver. Only the program stream components that contain the marred video content may be recorded by a VCR or DVD recorder. The marring causes the video to be unsuitable for piracy or rebroadcast.

Embodiments of the present invention provide content providers of digital video with the means to allow a consumer to view digital content and share it on a PVR type system while at the same time only allowing a marred version to be copied to a VCR or DVD recorder. These embodiments may or may not replace current encryption technology but allow the direct control of digital rights management (DRM) by the content provider. This invention may be used in conjunction with current encryption technology.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claim is:

1. A method for copy protection of video content comprising:
   identifying video content of a video signal suitable to be extracted;
   extracting said video content from said video signal;
   replacing extracted video content with marred video content in said video signal;
   placing said extracted video content in a second channel of a program stream for transmission to an electronic receiver for rendering; and
   transmitting portions of said video signal containing said marred video content in a first channel and said extracted video content in said second channel of said program stream to said electronic receiver, wherein said electronic receiver is operable to synchronize said marred video content with said extracted video content to generate a video signal comprising said extracted video content and said marred video content for rendering on a display of said electronic receiver.

2. The method of claim 1, wherein said identifying comprises the identification of encoded blocks having motion vectors.

3. The method of claim 1, wherein said second channel is a user data channel.

4. The method of claim 3, wherein said extracted video content is encoded in data packets with synchronization data operable to be decoded by said electronic receiver.

5. The method of claim 4, wherein said extracted video content is to be presented in a graphical overlay display plane of a displayed video image.

6. The method of claim 5, wherein said video signal content of said first channel is to be presented in a video image plane of a said displayed video image.

7. The method of claim 1, further comprising recording at said electronic receiver wherein only said video signal of said first channel can be recorded/reproduced by a videocassette or a digital video disc recorder.

8. The method of claim 1, wherein said extracting comprises extracting video content from different positions in successive video frames of said video signal.

9. The method of claim 8, wherein said second channel is a user data channel.

10. A method for copy protection of video content comprising:
    extracting video content from a video signal to transmit to an electronic receiver for rendering, wherein said video content is extracted from portions of said video signal that correspond to video blocks located in a series of video frames and is replaced with marred video content; and
    transmitting said video content that contains said marred video content in a first channel and transmitting extracted video content in a second channel of a program stream to said electronic receiver, wherein said electronic receiver is operable to synchronize said marred video content with said extracted video content to generate a video signal for rendering on a display of said electronic receiver.

11. The method of claim 10, Wherein said identifying comprises the identification of blocks having motion vectors.

12. The method of claim 11, wherein said marred video content is undesirable to view.

13. The method of claim 11, Wherein said second channel is a user data channel of said program stream.

14. The method of claim 13, wherein said extracted video content is to be presented in a graphical overlay display plane of said display.

15. The method of claim 14, wherein said video signal content that contains said marred video content is presented in a video image plane of said display.

16. The method of claim 10, further comprising recording at said electronic receiver wherein only said video signal content that contains said marred video content is supplied to a videocassette recorder or a digital video disc recorder.

17. The method of claim 10, wherein said extracting comprises extracting video content from different positions in successive video frames.

18. The method of claim 17, wherein said second channel is a user data channel.

19. A video transmission system comprising:
    an encoder for encoding a video input signal and for performing the following operations:
    a) identifying video content of said video signal that is suitable to be extracted;
    b) extracting said video content from said video signal;
    c) replacing extracted video content with marred video content in said video signal;

d) separating said extracted video content in a user data channel for transmission to an electronic receiver for rendering; and a transmitter for transmitting portions of said video signal that contain said marred video content in a first channel and transmitting said extracted video content in a second channel of said program stream to said electronic receiver, wherein said electronic receiver is operable to synchronize said marred video content with said extracted video content to generate a video signal for rendering on a display of said electronic receiver.

20. The system of claim 19, wherein said identifying comprises the identification of blocks having motion vectors.

21. The system of claim 20, wherein said marred video content is solid black, patterned or another solid color.

22. The system of claim 21, wherein said user data channel comprises information for synchronizing said first and second channels operable to be decoded by said electronic receiver.

23. The system of claim 22, wherein said extracted video content is to be presented in a graphical overlay display plane of a display unit.

24. The system of claim 23, wherein said video signal content of said first channel is to be presented in a video image plane of said display.

25. The system of claim 19, wherein said extracting video content comprises extracting video content from different positions in successive video frames.

26. A method of displaying copy protected content comprising:
   a) accessing an input video signal comprising a first channel and a separate second channel wherein said first channel comprises marred images and wherein said second channel comprises extracted images corresponding to said marred images;
   b) decoding first video content from said first channel and storing said first video content into a video display plane of a display unit, wherein said first video content comprises said marred images;
   c) decoding second video content from said second channel and, in synchronism with said b), storing said second video content into a graphics overlay plane of said display unit;
   d) generating a composite video image that comprises said first video content and said second video content in synchronism; and
   e) displaying said composite video image frame of said video display and graphics overlay planes of an electronic receiver wherein contents of said graphics overlay plane replace said marred images.

27. A method as described in claim 26 wherein said second channel is a user data channel.

28. A method as described in claim 26 wherein said extracted images derive from macro blocks that contain motion vectors.

29. A method as described in claim 28 wherein said extracted images derive from macro blocks that contain motion vectors.

30. A method as described in claim 29 wherein said extracted images derive from an arbitrarily selected section of source video material.

31. A method as described in claim 30 wherein extracted sections are located at the same or at different locations in subsequent frames of said source video material.

32. A method as described in claim 31 wherein only a selected subset of video frames may have video extracted to the user data channel.

33. A method as described in claim 30 wherein said video recording device is a video cassette recorder (VCR).

34. A method as described in claim 30 wherein said video recording device is a digital video disc (DVD) recorder.

35. A method as described in claim 26 further comprising supplying only video content from said first channel to a video recording device.

* * * * *